3,083,211
6-OXYGENATED TESTOLOLACTONES
Josef Fried, Princeton, and Richard W. Thoma, Somerville, N.J., assignors to Olin Mathieson Chemical Corporation, New York, N.Y., a corporation of Virginia
No Drawing. Filed June 14, 1961, Ser. No. 116,927
3 Claims. (Cl. 260—343.2)

This application is a continuation-in-part of our application, Serial No. 557,645, filed January 6, 1956, now abandoned.

This invention relates to, and has for its object, the provision of compounds of the general formula

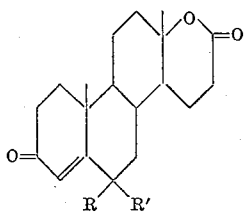

wherein R is hydrogen, R' is β-hydroxy or acyloxy, or together R and R' is keto. These compounds are pharmacologically-active substances, which, unlike testololactone, possess anti-androgenic activity and in addition are useful to augment the protein-anabolic activity of protein-anabolic steroids. Hence, the new compounds of this invention can be used in conjunction with known protein-anabolic steroids, such as testosterone propionate, in the treatment of post-operative shock and other conditions where tissue degeneration has occurred; or they can be used per se as anti-androgenic agents. In either event they may be administered either perorally or parenterally, being formulated for such administration in the same type of preparations as testosterone propionate, for example, with concentration and/or dosage based on the activity of the particular compound.

It has further been found that one of the compounds of this invention, namely, 6β-hydroxytestololactone (R is hydrogen, R' is β-hydroxy) can be prepared from testololactone by subjecting the latter to the action of enzymes of *Coniothyrium helleborine* or to the action of the organism itself under oxidizing and preferably arobic conditions; and further, that this new compound can either be oxidized to another of the compounds of this invention, namely, 6-ketotestololactone, or esterified to yield the 6β-acyloxy derivatives.

Among the compounds formed by the process of this invention are 6β-hydroxytestololactone, 6-ketotestololactone (R and R' is keto), and esters of 6β-hydroxytestololacetone. Although all ester derivatives have the activity of the free 6β-hydroxytestololactone, the preferred esters are those formed from organic carboxylic acids, especially from organic hydrocarbon carboxylic acids having less than ten carbon atoms, as exemplified by the lower alkanoic acids (e.g. acetic, propionic and butyric acid), the monocyclic aromatic carboxylic acids (e.g. benzoic, toluic, and xyloic acid), and the monocyclic aralkanoic acid (e.g. α-toluic and phenylacetic acid).

To prepare the compounds of this invention, testololactone is subjected to the action of enzymes of the microorganisms *Coniothyrium helleborine* under oxidizing conditions. This oxidation can best be effected by either including testololactone in an aerobic culture of the microorganism, or by bringing together, in an aqueous medium, the compounds, air, and enzymes of non-proliferating cells of the microorganism.

In general, the conditions of culturing *Coniothyrium helleborine* for the purposes of this invention are (except for the inclusion of the testololactone to be converted) the same as those of culturing various other molds for the production of antibiotics and/or vitamin B-12, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the compound itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e.g. soybean meal, corn steep liquor, meat extract and/or distillers solubles) or synthetic (i.e. composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The compound may be added to the culture during the incubation period, or included in the medium prior to sterilization or inoculation. The preferred (but not limiting) range of concentration of the compound in the culture is about 0.01 to 0.10%. The culture period (or rather the time of subjecting the compound to the action of the enzyme) may vary considerably, the range of about 6 to 96 hours being feasible, but not limiting.

The process yields, inter alia, 6β-hydroxytestololactone, which may be separated from the broth by extraction and from other concomitantly produced compounds by fractional crystallization. 6β-hydroxytestolactone can, if desides, either be esterified in the usual manner, as by treatment with the desired acid anhydride or acyl halide in an organic solvent (preferably in an organic base such as pyridine) to yield 6β-acyloxy-testololactone, or oxidized in the usual manner, as by treatment with a hexavalent chromium compound (e.g. chromic acid) to give 6-ketotestololactone.

The following examples are illustrative of the invention:

EXAMPLE 1

*6β-Hydroxytestololactone*

(a) *Fermentation.*—A fermentation medium of the following composition is prepared:

| | G. |
|---|---|
| Cerelose | 44 |
| Starch | 20 |
| Peptone liquor | 20 |
| Malted cereal extract syrup | 10 |
| NaNO₃ | 3 |
| KH₂PO₄ | 1 |
| KCl | 0.5 |
| MgSO₄·7H₂O | 0.5 |
| FeSO₄ | 0.01 |

Water to make one liter.

The pH of the medium is adjusted to 7.0±0.1 with 2 N NaOH solution, and 50 ml. portions of the medium are distributed in 250 ml. Erlenmeyer flasks, the flasks plugged with cotton and sterilized by autoclaving for 30 minutes at 120° C. When cool, each of the flasks is inoculated with 2.5 ml. of a suspension of the sporulated growth of a 15 day old cracked corn [15 g. cracked corn; 20 ml. distilled water] culture of the organism, the suspension being made in 150 ml. of water with 0.01% Duponal as wetting agent. The organism is *Coniothyrium helleborine* or derived strains thereof; the parent organism is obtainable, inter alia, from the Kansas State College Department of Botany.

The flasks are then mechanically shaken for 69 hours at 25° C. on a 280 cycle per minute rotary shaker, after which about 6% (v./v.) is transferred to each of 24 flasks containing 50 ml. of the following medium:

|  | G. |
|---|---|
| Glucose | 40 |
| $NaNO_3$ | 3 |
| $KH_2PO_4$ | 1 |
| KCl | 0.5 |
| $MgSO_4.7H_2O$ | 0.5 |
| $FeSO_4.7H_2O$ | 0.02 |

Water to make one liter.

After 24 hours' incubation, a total of 300 mg. of testololactone is added in 12 ml. of absolute methanol (0.5 ml. per flask). The flasks are then incubated an additional 48 hours, after which the flasks are harvested and the contents filtered through cheesecloth and washed with 250 ml. of water. The total volume of filtrate and wash is 1280 ml.

(b) *Isolation of 6β-hydroxytestololactone.*—The thus-obtained culture filtrate is extracted with three 800 ml. portions of chloroform and the chloroform solution evaporated to dryness in vacuo. The residue from the chloroform solution (about 305 mg.) is separated into the two components 6β-hydroxytestololactone and 7α-hydroxytestololactone by fractional crystallization from methanol.

The more soluble 6β-hydroxytestololactone (about 84 mg.) after recrystallization from acetone has the following properties: M.P. about 235–236° C.; $[\alpha]_D^{23}$ —13° (c. 0.75 in chloroform);

$\lambda_{max.}^{alc.}$ 236 m$\mu$ ($\epsilon$=15,400); $\lambda_{max.}^{Nujol}$ 2.89$\mu$ (OH); 5.80$\mu$ (lactone carbonyl); 6.01$\mu$, 6.18$\mu$ ($\Delta^4$-3-ketone)

*Analysis.*—Calculated for $C_{19}H_{26}O_4$ (318.40): C, 71.67; H, 8.23. Found: C, 71.37; H, 7.96.

6β-hydroxytestololactone can be esterified as illustrated in the following example:

EXAMPLE 2

*6β-Hydroxytestololactone 6β-Acetate*

A solution of 25 mg. of 6β-hydroxytestololactone in 0.5 ml. of acetic anhydride and 0.5 ml. of pyridine is allowed to stand at room temperature for 48 hours. After removal of the reagents in high vacuum, the residue is crystallized from acetone. This affords pure 6β-hydroxytestololactone acetate.

Similarly by substituting other acid anhydrides, such as propionic anhydride, or acyl halides, such as benzoyl chloride, for the acetic anhydride in the procedure of Example 2, the corresponding ester derivatives are produced.

6β-hydroxytestololactone can be oxidized to 6-ketotestololactone as illustrated by the following example:

EXAMPLE 3

*6-Ketotestololactone*

A solution of 23 mg. of 6β-hydroxytestololactone in 3 ml. of glacial acetic acid is oxidized at room temperature with 2 ml. of a solution containing 5 mg. of chromic acid per ml. of acetic acid. After 45 minutes excess chromic acid is destroyed with methanol and the solution is concentrated in vacuo. The residue is distributed between chloroform and water, the chloroform solution extracted with sodium bicarbonate and water, dried and evaporated to dryness in vacuo. The residue (about 24 mg.) is recrystallized from acetone-hexane to yield 6-ketotestololactone having the following properties: M.P. about 214–216° C.; $[\alpha]_D^{23}$ —68° (c. 0.45 in chloroform);

$\lambda_{max.}^{alc.}$ 247 m$\mu$ ($\epsilon$=11,000); $\lambda_{max.}^{2\%}$ KOH in MeOH 257 m$\mu$ ($\epsilon$=10,200); 378 m$\mu$ ($\epsilon$=8,500)

*Analysis.*—Calculated for $C_{19}H_{24}O_4$ (316.38): C, 72.12; H, 7.65. Found: C, 73.23; H, 8.60.

The invention may be variously otherwise embodied within the scope of the appended claims.

What is claimed is:

1. A compound of the formula

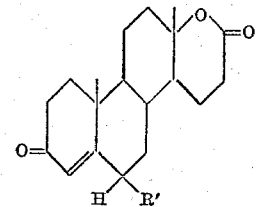

wherein R' is β-acyloxy, wherein the acyl radical is of an organic hydrocarbon carboxylic acid of less than ten carbon atoms selected from the group consisting of lower alkanoic acids, monocyclic aromatic carboxylic acids and monocyclic aralkanoic acids.

2. 6β-hydroxytestololactone.

3. 6β-hydroxytestololactone 6-acetate.

References Cited in the file of this patent

UNITED STATES PATENTS

| 2,499,247 | Jacobsen et al. | Feb. 28, 1950 |
| 2,686,791 | Murray et al. | Aug. 17, 1954 |
| 2,697,715 | Eppstein et al. | Dec. 21, 1954 |
| 2,697,716 | Eppstein et al. | Dec. 21, 1954 |
| 2,847,422 | Dodson et al. | Aug. 12, 1958 |